United States Patent
Li et al.

(10) Patent No.: US 9,042,692 B2
(45) Date of Patent: May 26, 2015

(54) UNIVERSAL OPTICAL FIBERS FOR OPTICAL FIBER CONNECTORS

(71) Applicant: CORNING CABLE SYSTEMS LLC, Hickory, NC (US)

(72) Inventors: Ming-Jun Li, Horseheads, NY (US); Gaozhu Peng, Horseheads, NY (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 14/010,947

(22) Filed: Aug. 27, 2013

(65) Prior Publication Data

US 2015/0063754 A1 Mar. 5, 2015

(51) Int. Cl.
- G02B 6/26 (2006.01)
- G02B 6/036 (2006.01)
- G02B 6/028 (2006.01)
- B29D 11/00 (2006.01)
- G02B 6/38 (2006.01)

(52) U.S. Cl.
CPC ............ *G02B 6/262* (2013.01); *G02B 6/03611* (2013.01); *G02B 6/0281* (2013.01); *B29D 11/00682* (2013.01); *G02B 6/3846* (2013.01); *G02B 6/03644* (2013.01); *C03B 2203/22* (2013.01)

(58) Field of Classification Search
CPC ............ G02B 6/3846; G02B 6/03644; G02B 6/03611; G02B 6/0281; G02B 6/262; B29D 11/00682; C03B 2203/22
USPC ............................... 385/50, 60, 122, 124, 126
See application file for complete search history.

(56) References Cited

U.S. PATENT DOCUMENTS

| | | | | |
|---|---|---|---|---|
| 4,715,679 A * | 12/1987 | Bhagavatula | ........... | 385/127 |
| 4,877,304 A * | 10/1989 | Bhagavatula | ........... | 385/124 |
| 4,889,404 A * | 12/1989 | Bhagavatula et al. | ........... | 398/79 |
| 5,483,612 A * | 1/1996 | Gallagher et al. | ........... | 385/127 |
| 5,553,185 A * | 9/1996 | Antos et al. | ........... | 385/127 |
| 5,649,044 A * | 7/1997 | Bhagavatula | ........... | 385/124 |
| 5,684,909 A * | 11/1997 | Liu | ........... | 385/127 |
| 5,729,645 A * | 3/1998 | Garito et al. | ........... | 385/127 |
| 5,748,824 A * | 5/1998 | Smith | ........... | 385/124 |
| 6,317,551 B1 * | 11/2001 | Mitchell et al. | ........... | 385/124 |
| 6,343,176 B1 * | 1/2002 | Li et al. | ........... | 385/127 |
| 6,421,491 B1 * | 7/2002 | Liu | ........... | 385/127 |
| 6,424,778 B1 * | 7/2002 | Li | ........... | 385/127 |
| 6,701,053 B2 * | 3/2004 | Liu | ........... | 385/127 |
| 7,003,203 B2 * | 2/2006 | Wood | ........... | 385/124 |
| 7,043,125 B2 * | 5/2006 | Diep et al. | ........... | 385/123 |
| 7,085,464 B2 * | 8/2006 | Miyabe et al. | ........... | 385/127 |
| 7,689,083 B1 * | 3/2010 | Rosenblum | ........... | 385/123 |

(Continued)

FOREIGN PATENT DOCUMENTS

JP 2009157262 A * 7/2009

OTHER PUBLICATIONS

Luc B. Jeunhomme "Single-Mode Fiber Optics"; Principles and Applications; Second Edition; pp. 38-45.

*Primary Examiner* — Peter Radkowski

(57) ABSTRACT

An optical fiber for use as a stub fiber in an optical fiber connector is disclosed. The optical fiber is configured with a segmented core that includes a single-mode segment with a step-index profile and at least one multimode segment having at least one alpha profile. A connector that employs the stub fiber can connect to both a single mode fiber and a multimode fiber.

23 Claims, 8 Drawing Sheets

(56) References Cited

U.S. PATENT DOCUMENTS

| | | | |
|---|---|---|---|
| 7,853,110 B2* | 12/2010 | Bickham et al. | 385/127 |
| 2002/0044755 A1* | 4/2002 | Li | 385/127 |
| 2002/0141719 A1* | 10/2002 | Liu | 385/127 |
| 2003/0026566 A1* | 2/2003 | Diep et al. | 385/123 |
| 2003/0077048 A1* | 4/2003 | Radek et al. | 385/81 |
| 2003/0223717 A1* | 12/2003 | Blaszyk et al. | 385/127 |
| 2004/0105642 A1* | 6/2004 | Bickham | 385/127 |
| 2004/0202423 A1* | 10/2004 | White | 385/39 |
| 2005/0013571 A1* | 1/2005 | Wood | 385/127 |
| 2005/0163444 A1* | 7/2005 | Miyabe et al. | 385/127 |
| 2005/0213892 A1* | 9/2005 | Barnes et al. | 385/62 |
| 2006/0013548 A1* | 1/2006 | Mishra et al. | 385/127 |
| 2008/0219624 A1* | 9/2008 | Pimpinella et al. | 385/60 |
| 2009/0148113 A1* | 6/2009 | Bickham et al. | 385/127 |
| 2010/0021116 A1* | 1/2010 | Mishra | 385/127 |

* cited by examiner

UNIVERSAL OPTICAL FIBERS FOR OPTICAL FIBER CONNECTORS

FIELD

The present disclosure relates to optical fibers and optical fiber connectors, and in particular relates to universal optical fibers for use in optical fiber connectors that can connect with single-mode or multi-mode optical fibers.

BACKGROUND

Optical fiber connectors are used in a variety of telecommunications applications to connect one optical fiber to another, or to connect an optical fiber to a telecommunications device. Certain optical fiber connectors (e.g., the UniCam® fiber optic connector made by Corning Cable Systems LLC) include a short (e.g., 15 mm to 20 mm) section of optical fiber called a stub fiber that interfaces with a field optical fiber within the connector. When a connector is operably connected (mated) to another connector, the stub fiber resides between the field fiber of its own connector and the stub fiber of the mating connector.

Presently, a single-mode stub fiber is used in an optical fiber connector intended to connect to single mode fibers, and a multi-mode stub fiber is used in an optical fiber connector intended to connect to multimode optical fibers. Furthermore, as multimode optical fibers can have a core diameter of 50 microns or 62.5 microns, a conventional multimode connector has a correspondingly sized multimode stub fiber. This means that many different types of connectors are required for use across the possible types of fiber connections that can be made in the field. This adds substantial cost and inconvenience to the connection process.

SUMMARY

Universal optical fibers suitable for use as a stub fiber in forming a universal optical fiber connector that can connect to single mode fibers or multimode fibers are disclosed herein. The universal optical fibers have a fundamental mode that matches the mode field diameter (MFD) of standard single mode fibers to ensure low connector loss for single mode connections, and have substantially the same or a smaller group index difference $\Delta n_g$ for reducing adverse multi-path interference (MPI) effects as compared with conventional single mode fibers (e.g., SMF-28 or SMF28e single-mode optical fibers). The universal optical fibers disclosed herein have numerical apertures (NAs) and core segments with dimensions that substantially match that of standard multimode optical fibers to ensure low connectors loss for multimode connections.

An aspect of the disclosure is an optical fiber for use in an optical fiber connector. The optical fiber has a segmented core with a relative refractive index $\Delta_1$ in the range $0.3\% \le \Delta_1 \le 2.5\%$ and having a substantially step-index single-mode segment with a radius $r_1$ in the range $2.5\ \mu m \le r_1 \le 5\ \mu m$ and a relative refractive index $\Delta_s$ or $\Delta_s + \Delta_t$ in the range from 0.2% to 0.4% (i.e., $0.2\% \le \{\Delta_s$ or $\Delta_s + \Delta_t\} \le 0.4\%$), and at least one alpha-profile multimode segment having a radius $r_0$ in the range $10\ \mu m \le r_0 \le 50\ \mu m$ and a profile parameter $\alpha$ in the range $1.8 \le \alpha \le 4.1$. The optical fiber has a cladding surrounding the segmented core, the cladding having an inner cladding segment of width w in the range $5\ \mu m \le w \le 20\ \mu m$ and relative refractive index $\Delta_2$, and an outer cladding segment having a relative refractive index $\Delta_3$, wherein $1.5\% \le \Delta_2 \le \Delta_3$.

Another aspect of the disclosure is an optical fiber for use in an optical fiber connector. The optical fiber includes a segmented core having a substantially step-index single-mode segment and at least one multimode segment having an alpha profile, wherein the segmented core has an associated mode field diameter substantially the same as a conventional single-mode optical fiber, and has substantially the same or a smaller group index difference $\Delta n_g$ as compared to the conventional single mode fiber. The at least one multimode segment has radius and a numerical aperture $NA_{MM}$ that substantially match that of a conventional multimode optical fiber.

Another aspect of the disclosure is an optical fiber connector that uses a section of length L of either of the optical fibers described above as a stub fiber. The stub fiber has a first end and is operably supported by a first alignment member. The optical fiber connector has a field optical fiber operably supported relative to the first alignment member by a second alignment member such that the respective first and second ends of the stub fiber and field optical fiber are operably aligned and interfaced.

Another aspect of the disclosure is an optical fiber connector for connecting to either a single-mode optical fiber or a multi-mode optical fiber. The optical fiber connector includes a stub fiber having a first end and a core having single-mode and multimode segments. The single-mode segment has a mode field diameter substantially the same as that of a conventional single-mode optical fiber and has substantially the same or a smaller group index difference $\Delta n_g$ as compared to the conventional single mode fiber. The multimode segment has a radius and a numerical aperture $NA_{MM}$ that substantially matches that of a conventional multimode optical fiber. The optical fiber connector also has a first alignment member that operably supports the stub fiber. The optical fiber connector also has a field optical fiber having a second end and is operably supported relative to the first alignment member by a second alignment member such that the respective first and second ends of the stub fiber and field optical fiber are operably aligned and interfaced.

These and other aspects of the disclosure will be further understood and appreciated by those skilled in the art by reference to the following specification, claims and appended drawings.

BRIEF DESCRIPTION OF THE DRAWINGS

A more complete understanding of the present disclosure can be had by reference to the following Detailed Description when taken in conjunction with the accompanying drawings, where.

DETAILED DESCRIPTION

Figure 1:
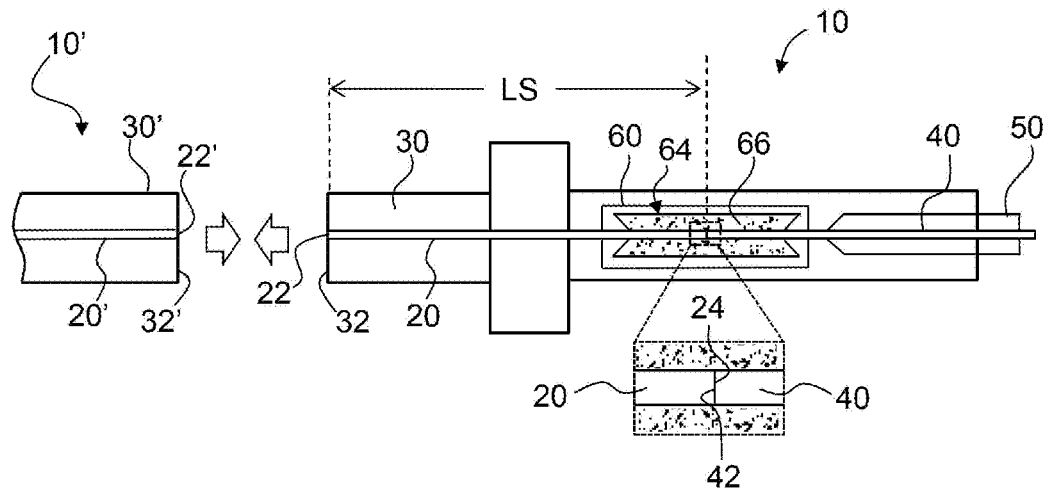
FIG. 1 is a schematic cross-sectional view of an example prior art optical fiber connector that employs a single-mode stub fiber.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

Definitions

The symbol "μm" and the word "micron" are used interchangeably herein.

Mode field diameter or MFD is a measure of the spot size or beam width of light propagating in an optical fiber. The MFD is a function of the source wavelength, fiber core radius ($r_0$) and fiber refractive index profile. In an example, the mode field diameter MFD can be measured using the Peterman II method, where MFD=2w, and $$w^2 = 2 \frac{\int_0^\infty E^2 r\, dr}{\int_0^\infty (dE/dr)^2 r\, dr},$$

where E is the electric field distribution in the optical fiber and r is the radial coordinate of the optical fiber. The MFD of a standards-compliant single-mode optical fiber is denoted herein as $MFD_S$, while the MFD of the single-mode optical fiber 100 disclosed below is denoted $MFD_{NS}$.

The term "relative refractive index," as used herein, is defined as:

$$\Delta(r) = [n(r)^2 - n_{REF}^2]/2n(r)^2,$$

where n(r) is the refractive index at radius r, unless otherwise specified. The relative refractive index is defined at 1550 nm unless otherwise specified. In one aspect, the reference index $n_{REF}$ is silica glass. In another aspect, $n_{REF}$ is the maximum refractive index of the cladding. As used herein, the relative refractive index is represented by Δ and its values are given in units of "%", unless otherwise specified. In cases where the refractive index of a region is less than the reference index $n_{REF}$, the relative refractive index is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative refractive index is positive and the region can be said to be raised or to have a positive index.

The parameter α (also called the "profile parameter" or "alpha parameter") as used herein relates to the relative refractive index Δ, which is in units of "%," where r is the radius (radial coordinate), and which is defined by:

$$\Delta(r) = \Delta_0 \left[1 - \left(\frac{r - r_m}{r_0 - r_m}\right)^\alpha\right],$$

where $r_m$ is the point where Δ(r) is the maximum $\Delta_0$, $r_0$ is the point at which Δ(r) % is zero, and r is in the range $r_i \leq r \leq r_f$, where Δ(r) is defined above, $r_i$ is the initial point of the α-profile, $r_f$ is the final point of the α-profile, and α is an exponent which is a real number. For a step index profile, α>10 and for a gradient-index profile, α<5. It is noted here that different forms for the core radius $r_0$ and maximum relative refractive index $\Delta_0$ can be used without affecting the fundamental definition of Δ. The maximum relative refractive index $\Delta_0$ is also called the "core delta," and these terms are used interchangeably herein.

The limits on any ranges cited herein are considered to be inclusive and thus to lie within the range unless otherwise specified.

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index Δ.

The term "mode" is short for a guided mode. A single mode fiber (SMF) as the term is used herein means an optical fiber designed to support only a single mode over a substantial length of the optical fiber (e.g., 2 meters or longer) but that under certain circumstances can support multiple modes over short distances (e.g., tens of millimeters, for example a length L≤20 mm). In contrast, a multi-mode optical fiber (MMF) means an optical fiber designed to support the fundamental mode and at least one higher-order mode over a substantial length of the optical fiber, such as 2 meters or longer.

The cutoff wavelength $\lambda_C$ of a mode is the minimum wavelength beyond which a mode ceases to propagate in the optical fiber. The cutoff wavelength $\lambda_C$ of a single mode fiber is the minimum wavelength at which an optical fiber will support only one propagating mode, i.e., below the cutoff wavelength, two or more modes can propagate. Typically the highest cutoff wavelength $\lambda_C$ of a multimode optical fiber corresponds to the cutoff wavelength of the $LP_{11}$ mode. A mathematical definition can be found in Single Mode Fiber Optics, Jeunhomme, pp. 39-44, Marcel Dekker, New York, 1990, wherein the theoretical fiber cutoff is described as the wavelength at which the mode propagation constant becomes equal to the plane wave propagation constant in the outer cladding. This theoretical cutoff wavelength is appropriate for an infinitely long, perfectly straight fiber that has no diameter variations. A measured cutoff wavelength $\lambda_C$ is normally lower than the theoretical cutoff wavelength, typically 20 nm to 50 nm lower for a 2 meter fiber with substantially straight deployment.

The operating wavelength λ is the wavelength at which a particular optical fiber operates, with example first and second operating wavelengths being 1310 nm and 1550 nm, which are commonly used in telecommunications systems that include optical fiber connectors of the type disclosed herein.

The fibers "SMF28" and "SMF-28e" as used hereinbelow refer to particular types of conventional, standards-compliant single mode fibers made by Corning, Inc., of Corning, N.Y. The terms SFM28 and SMF-28e are registered trademarks of Corning, Inc.
Connector FIG. 1 is a schematic cross-sectional diagram of an example conventional field-mountable optical fiber connector ("connector") 10, which is based generally on the Uni-Cam® optical fiber connector from Corning Cable Systems LLC of Hickory, N.C. The connector 10 includes a stub fiber 20 that has opposite ends 22 and 24, and that in an example has a length L in the range from 10 mm to 20 mm, or 13 mm to 20 mm or 15 mm to 20 mm. The stub fiber 20 is supported by a stub alignment member 30 (e.g., a ferrule), and in an example the stub fiber is secured therein using, for example, an epoxy. The stub alignment member 30 has a straight face or tip 32, which is factory polished so that the corresponding stub fiber end 22 is also polished.

The optical fiber connector 10 also includes a field optical fiber ("field fiber") 40 that has an end 42 and that is operably supported by an alignment member 50, e.g., a ferrule. The stub fiber 20 is optically coupled to field fiber 40 by aligning and interfacing the two fibers at their respective ends 24 and 42. This is accomplished, for example, via a mechanical or fusion splice member 60 that includes an interior 64, which in an example contains an index-matching material (e.g., a gel) 66 of refractive index $n_G$.

FIG. 1 also shows an end portion of a mating connector 10' configured to mate with connector 10. The mating connector 10' can be a stub-fiber type of connector that includes an alignment member 30' that supports a stub fiber 20' having an end 22' at a straight facet 32'. The mating connector 10' can be also a regular connector built on a fiber jumper.

Figure 2:
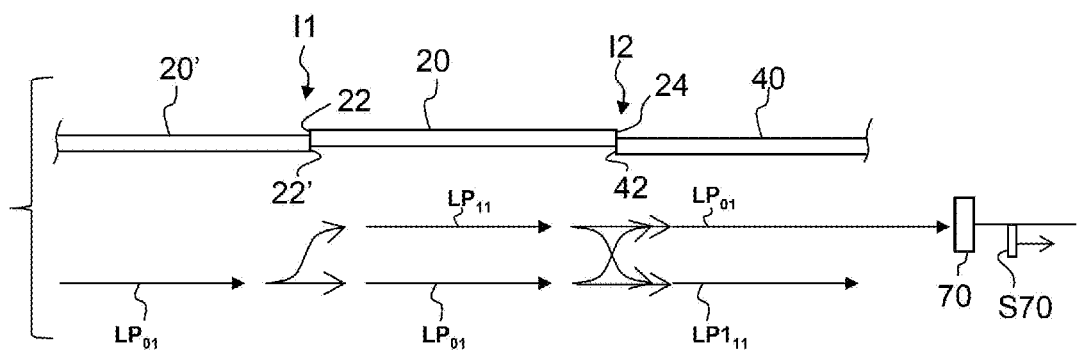
FIG. 2 is a close-up side view of first and second stub fibers and a field fiber in a misaligned configuration that can arise when two optical fiber connectors like those in FIG. 1 are mated.

FIG. 2 is a close-up view of stub fiber 20' of connector 10', stub fiber 20 of connector 10, and field fiber 40 of connector 10 in a misaligned configuration that can arise when connectors 10' and 10 of FIG. 1 are mated. The three fibers shown in FIG. 2 are optically coupled at interfaces I1 and I2. In this configuration, stub fiber 20' is the launching fiber and field fiber 40 is the receiving fiber.

The optical fibers 20' and 20 are shown as being misaligned (offset) relative to one another at interface I1, while stub and field fibers 20 and 40 are shown as being misaligned relative to one another at interface I2. These misalignments can and do happen in practice.

As shown in the lower half of FIG. 2, the fundamental mode $LP_{01}$ travels in stub fiber 20' of connector 10' toward stub fiber 20. Because stub fibers 20 and 20' are misaligned, the fundamental mode $LP_{01}$ excites a higher-order $LP_{11}$ mode to travel in stub fiber 20, so that now both the fundamental mode $LP_{01}$ and the higher-order mode $LP_{11}$ travel in stub fiber 20. When these two modes encounter the misaligned field fiber 40, the fundamental $LP_{01}$ mode of stub fiber 20 couples mainly to the fundamental $LP_{01}$ mode of field fiber 40. However, some light of the fundamental $LP_{01}$ mode of stub fiber 20 couples to the higher order $LP_{11}$ mode of field fiber 40.

Similarly, the higher order $LP_{11}$ mode of stub fiber 20 couples mainly to the higher order $LP_{11}$ of field fiber 40. Some light of the higher order $LP_{11}$ mode of stub fiber 20 couples also to the fundamental $LP_{01}$ mode of field fiber 40. After propagating a certain length in field fiber 40, the $LP_{11}$ mode gets cut off and only the fundamental $LP_{01}$ mode travels therein. Light from the fundamental $LP_{01}$ mode ultimately gets detected, as shown by a photodetector 70 and a corresponding electrical signal S70. Because the $LP_{01}$ and $LP_{11}$ modes from stub fiber 20 have different phases, the power of the excited $LP_{01}$ mode in field fiber 40 exhibits an oscillation behavior as a function of wavelength due to interference effects. The light associated with the higher order mode $LP_{11}$ is lost.

With continuing reference again to FIG. 2, the amount of optical power transmitted by field fiber 40 depends on the coupling or transmission efficiencies at the two optical fiber interfaces (joints) I1 and I2. The transmission efficiencies are determined by the amount of misalignment (e.g., transverse offset, gap, angular offset) between the two interfacing fibers, their orientation (angle) at the first and second interfaces, and the polarization of light traveling within the fibers. The amount of transmitted optical power also depends on the attenuation of higher-order modes in the fiber over the length of the fiber segment, and the delay between the different modes. A stub fiber can have a length L in the range from 10 mm to 20 mm, with 15 mm to 20 mm being typical.

The transmission efficiency $\eta$ can be expressed mathematically as:

$$\eta = \eta_{01\ 01}^{(1)}\eta_{01\ 01}^{(2)} + \sum_{l,m}\eta_{01\ lm}^{(1)}\eta_{lm\ 01}^{(2)}e^{-\alpha_{lm}L} + \qquad (1)$$
$$\sum_{l,m}2\sqrt{\eta_{01\ 01}^{(1)}\eta_{01\ 01}^{(2)}\eta_{01\ lm}^{(1)}\eta_{lm\ 01}^{(2)}}\ e^{-\frac{\alpha_{lm}}{2}L}\cos\left(\frac{2\pi\Delta n_{lm}L}{\lambda}\right).$$

In most cases the $LP_{11}$ mode is the dominant higher-order mode, in which case:

$$\eta = \eta_{01\ 01}^{(1)}\eta_{01\ 01}^{(2)} + \eta_{01\ 11}^{(1)}\eta_{11\ 01}^{(2)}e^{-2\alpha_{11}L} + \qquad (2)$$
$$2\sqrt{\eta_{01\ 01}^{(1)}\eta_{01\ 01}^{(2)}\eta_{01\ 11}^{(1)}\eta_{11\ 01}^{(2)}}\ e^{-\frac{\alpha_{11}}{2}L}\cos\left(\frac{2\pi\Delta n_{11}L}{\lambda}\right),$$

where $\eta_{01\ 01}^{(1)}$ is the coupling coefficient of the $LP_{01}$ mode from the launching fiber to the stub fiber, $\eta_{01\ 01}^{(2)}$ is the coupling coefficient from the stub fiber to the receiving fiber, $\eta_{01\ lm}^{(1)}$ is the coupling coefficient from the $LP_{01}$ mode to a higher-order mode $LP_{lm}$, $\eta_{lm\ 01}^{(2)}$ is the coupling coefficient from the $LP_{lm}$ to the $LP_{01}$ mode at the second joint, $\Delta n_{lm}$ is the effective index difference between the $LP_{lm}$ mode and the $LP_{01}$ mode, $\lambda$ is the operating wavelength of light from a coherent light source (not shown), and $\alpha_{lm}$ is the attenuation coefficient of the $LP_{lm}$ mode and is not to be confused with the $\alpha$ parameter associated with the effective refractive index profile $\Delta$.

From Eq. (2), the transmission efficiency fluctuation can be expressed as:

$$\frac{d\eta}{d\lambda} = \qquad (3)$$
$$\frac{4\pi L}{\lambda^2}\left(\Delta n_{11} - \frac{d\Delta n_{11}}{d\lambda}\right)\sqrt{\eta_{01\ 01}^{(1)}\eta_{01\ 01}^{(2)}\eta_{01\ 11}^{(1)}\eta_{11\ 01}^{(2)}}\ e^{-\frac{\alpha_{11}}{2}L}\sin\left(\frac{2\pi\Delta n_{11}L}{\lambda}\right) =$$
$$\frac{4\pi L}{\lambda^2}\Delta n_{g11}\sqrt{\eta_{01\ 01}^{(1)}\eta_{01\ 01}^{(2)}\eta_{01\ 11}^{(1)}\eta_{11\ 01}^{(2)}}\ e^{-\frac{\alpha_{11}}{2}L}\sin\left(\frac{2\pi\Delta n_{11}L}{\lambda}\right)$$

Figure 3:
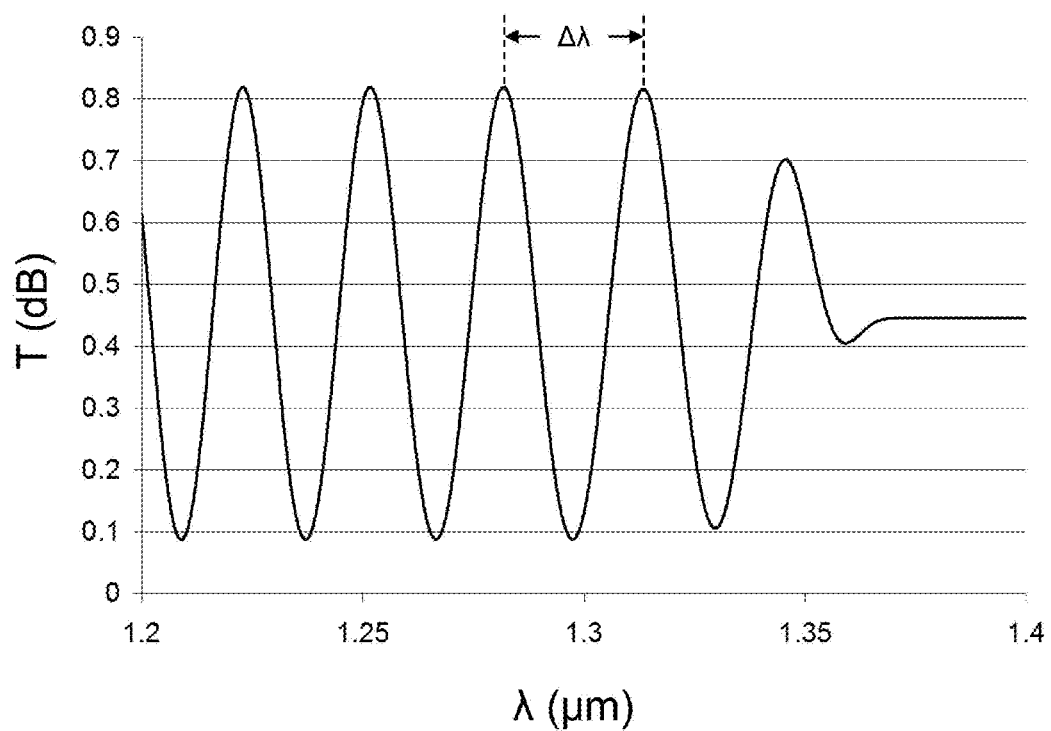
FIG. 3 is a plot of the operating wavelength $\lambda$ (microns) versus transmission (dB) and shows an example transmission efficiency curve for an example conventional stub fiber, with the peak-to-peak wavelength spacing $\Delta\lambda$ of about 32 nm shown in the plot.

FIG. 3 is a plot of operating $\lambda$ wavelength (microns) versus transmission T (dB) and shows an example transmission efficiency of an example conventional single-mode stub fiber, with the peak-to-peak wavelength spacing $\Delta\lambda$ of about 32 nm as shown in the plot. From Eq. (3), the peak-to-peak wavelength spacing (i.e., the transmission fluctuation wavelength spacing) can be obtained by the relationship:

$$\Delta\lambda=\lambda^2/(\Delta n_{g11}L), \qquad (4)$$

where $\Delta n_{g11}$ is the group index difference for the $LP_{11}$ mode versus the $LP_{01}$ mode and L is the length of the optical fiber. As a reference, for a stub fiber made of SMF-28e fiber, with a group index difference $\Delta n_{g11}=0.004$, an operating wavelength $\lambda=1310$ nm and a length L=13.3 mm yields the transmission fluctuation wavelength spacing $\Delta\lambda$ of about 32 nm as shown in the plot (for L=15 mm, $\Delta\lambda$ is about 29 nm). This transmission fluctuation wavelength spacing $\Delta\lambda$ is relatively short and translates into a high probability of MPI occurring over the length of the stub fiber.

Equations (3) and (4) show that there are three main factors that affect the fluctuation in the transmission efficiency: the loss of higher-order modes, the group index difference $\Delta n_g$ and the coupling coefficients η at the fiber interfaces. Particularly the transmission fluctuation can be reduced by increasing the loss of the higher-order modes, while optimizing the coupling coefficients. One way to increase the loss of the higher order modes is to reduce the cutoff wavelength $\lambda_C$ of fiber.

Universal Optical Fiber

Figure 4:
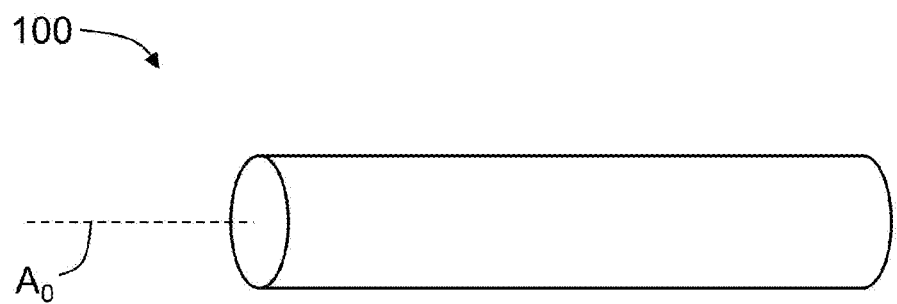
FIG. 4 is an elevated view of a section of the universal optical fiber as disclosed herein.

FIG. 4 is an elevated view of a section of a universal optical fiber ("fiber") 100, which has a central axis $A_0$. Fiber 100 can be used as a stub fiber in a connector to enable the connector to connect to both single-mode and multimode fibers.

Figure 5A:
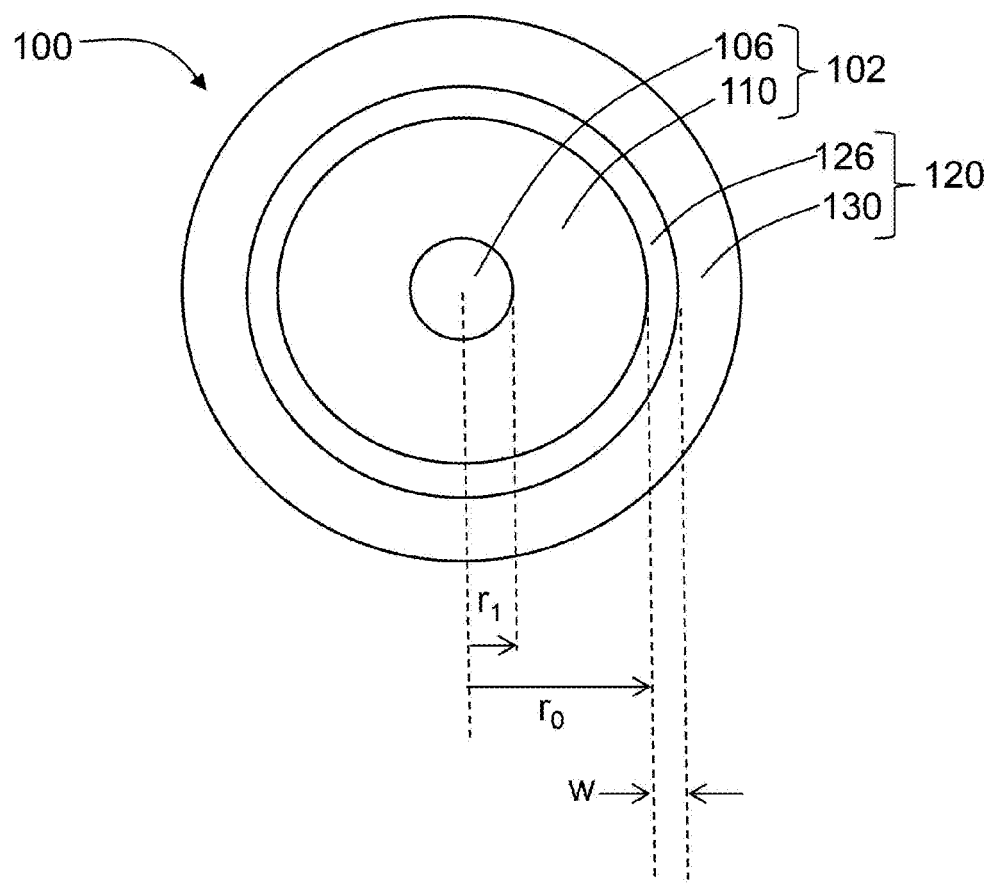
FIGS. 5A through 5C are cross-sectional views of exemplary configurations for the universal optical fiber according to the disclosure.
Figure 5B:
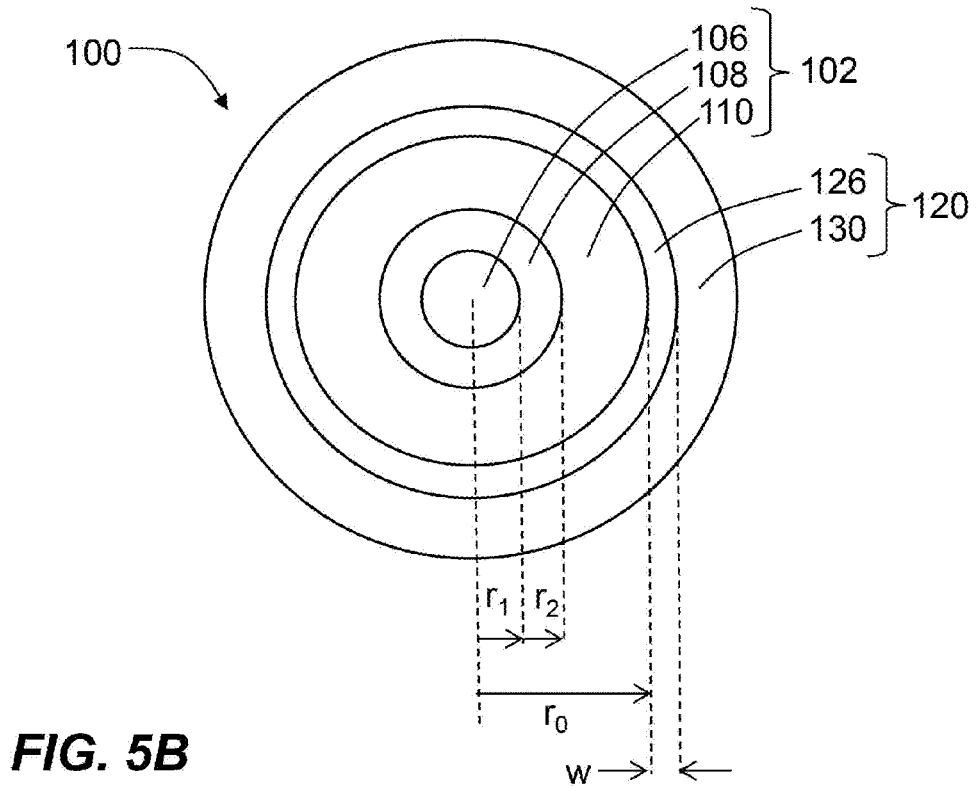
Figure 5C:
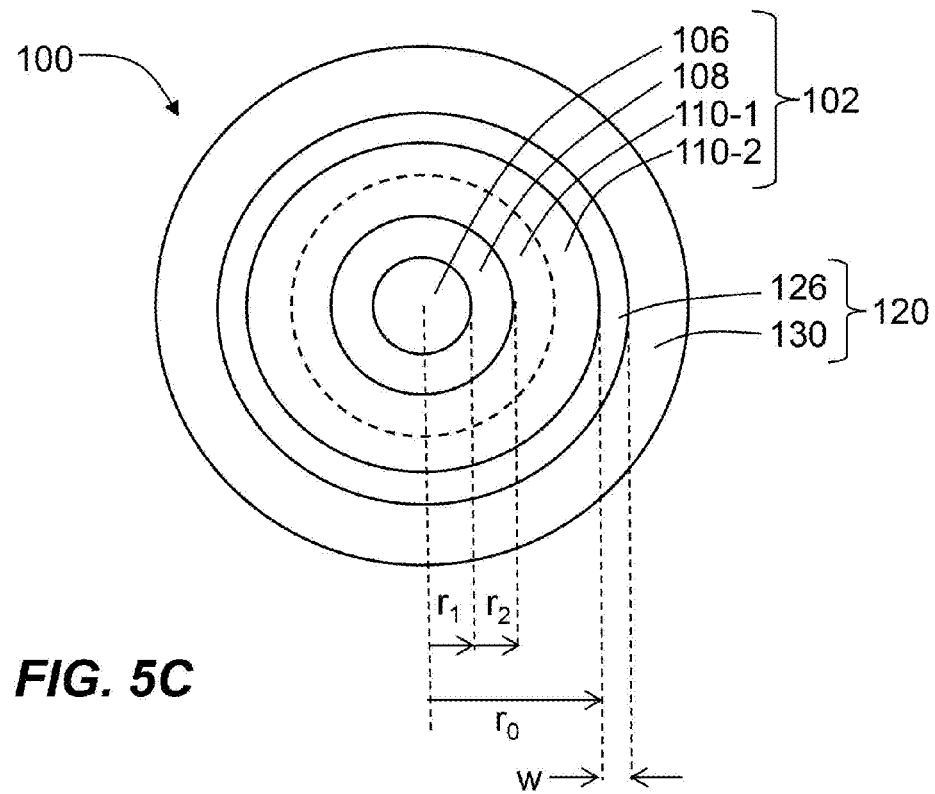

FIGS. 5A through 5C are cross-sectional views of fiber 100 of FIG. 4 and show example configurations for the fiber. Fiber 100 has segmented core 102 that has a first (inner) core segment 106 having a radius $r_1$ and at least a second (outer) core segment 110 having a radius $r_0$ and a relative refractive index $\Delta_0$. The inner and outer core segments 106 and 110 are respectively associated with single-mode and multimode operations and so can be respectively referred to as the "single-mode core" and the "multimode core." FIG. 5C shows an example where the outer core segment 110 includes two sections 110-1 and 110-2 that in an example can have different alpha profiles, as discussed below.

Fiber 100 can also have a segmented cladding 120 with first (inner) cladding segment 126 of width w and a second (outer) cladding segment 130. The configuration of FIG. 5B includes a depressed cladding layer (trench) 108 residing between the first and second core segments 106 and 110 and has an associated relative refractive index $\Delta_t$ measured relative to $\Delta$ at $r=r_2$, noting that $\Delta$ varies with r according to an alpha profile. The relative refractive index of inner cladding segment 126 is denoted $\Delta_2$, while the outer cladding 30 has relative refractive index of $\Delta_3$, wherein $\Delta_3=0$ if the outer cladding is made of pure silica. In an example, $\Delta_2=\Delta_3$, in which case cladding 120 is not segmented.

In an example, core 102 comprises pure silica glass ($SiO_2$) or silica glass with one or more dopants. Suitable dopants include $GeO_2$, $Al_2O_3$, $P_2O_5$, $TlO_2$, $ZrO_2$, $Nb_2O_5$, and $Ta_2O_5$, as well as combinations thereof. The dopants act to increases the relative refractive index $\Delta$ in a graded-index fashion, such as associated with second core segment 110, though they can be used to form a substantially step-like index profile, as is characteristic of first core segment 106. In an ideal case, the relative refractive index has a maximum at r=0, i.e., on an optical fiber central axis $A_0$ in first core segment 106. First and second core segments 106 and 110 have associated relative refractive indices $\Delta_1$ and $\Delta_0$, with $\Delta_S=\text{Max}\{\Delta_1-\Delta_0(r=r_2)\}$. All the $\Delta$'s herein are measured with reference to pure silica glass.

Thus, in fiber 100, the central first core segment 106 is associated with single-mode operation and has substantially step-index profile (i.e., $\Delta_1$ is substantially constant from r=0 to $r=r_1$). The first and second core segments 106 and 110 (i.e., the central step-index first segment plus the graded-index second core segment, including optional depressed cladding layer 108) can be used for multimode operation. If $\Delta_2=\Delta_3=0$, then the $\Delta$ profile is made with up-doping only with no down-doping. In this case, the peak delta $\Delta_1$ is the highest for the same core numerical aperture.

Figure 6:
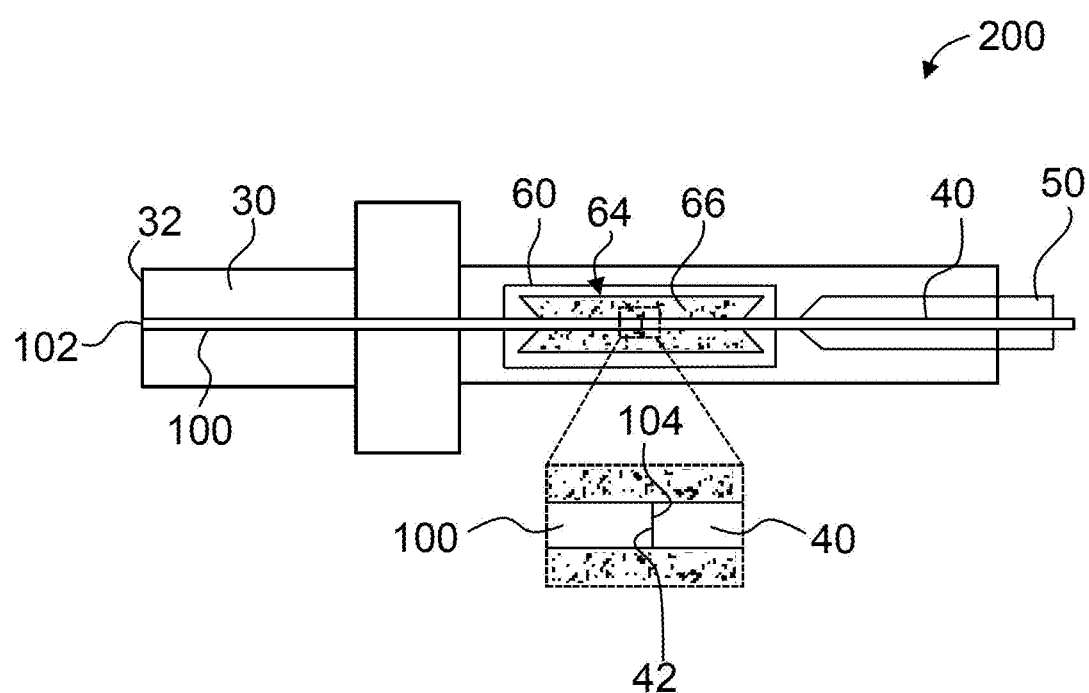
FIG. 6 is similar to FIG. 1 and shows an exemplary optical fiber connector that uses the universal optical fiber disclosed herein as the stub fiber.

FIG. 6 is similar to FIG. 1 and shows an example embodiment of a connector 200 similar to connector 10, but that includes fiber 100 with opposite ends 102 and 104 serving as the stub fiber.

In an example, fiber 100 has a number of attributes, including:
1) The MFD of the fundamental mode substantially matches that of conventional launching and receiving single mode fibers to ensure low connector loss for single-mode operation;
2) A low-cutoff wavelength $\lambda_C$ of the $LP_{11}$ mode for the first (single-mode) core segment 106;
3) A maximum $\Delta$ that is low enough to provide a low return loss RL;
4) A group delay or group index difference $\Delta n_g$, particularly for the first two groups of modes, i.e. $LP_{01}$ and $LP_{11}$ (i.e., $\Delta n_{g11}$) that is smaller than or substantially the same as a conventional single mode fiber, such as SFM28 or SMF-28e; and
5) The NAs and diameter $r_0$ of the whole core (first and second core segments 106 and 110) are similar to those of standard multimode fibers to ensure low connector loss for multimode operation.

For multimode connections, there are a large number of modes so that MPI is typically not an issue. For minimizing group delay and matching mode field diameter (MFD) to reduce MPI, the profile parameters core delta, core alpha and core size need to be carefully chosen.

Example Fiber Configurations

FIGS. 7A through 7D are plots of the relative refractive index $\Delta$ vs. radius r for different example configurations of fiber 100. In example embodiments, $\Delta_1$ satisfies $0.3\% \leq \Delta_1 \leq 2.5\%$, or $0.4\% \leq \Delta_1 \leq 2\%$, or even $0.6\% \leq \Delta_1 \leq 1\%$. Also in example embodiments, $\Delta_s$ in the configuration of FIG. 7A, or $\Delta_s+\Delta_t$ in the configurations of FIGS. 7B through 7D satisfies $0.2\% \leq \{\Delta_s$ or $\Delta_s+\Delta_t\} \leq 0.4\%$.

In example embodiments, radius $r_1$ of the first core segment 106 satisfies 2.5 µm≤$r_1$≤5 µm, or even 2.5™≤$r_1$≤4 µm. Also in example embodiment, the radius $r_0$ of the second core segment 110 satisfies 10 µm≤$r_0$≤50 µm or 15 µm≤$r_0$≤40 µm or 22 µm≤$r_0$≤35 µm. In other example embodiments, the second core segment 110 has an alpha profile that satisfies 1.8≤α≤4.1, or even 1.9≤α≤2.5.

Figure 8:
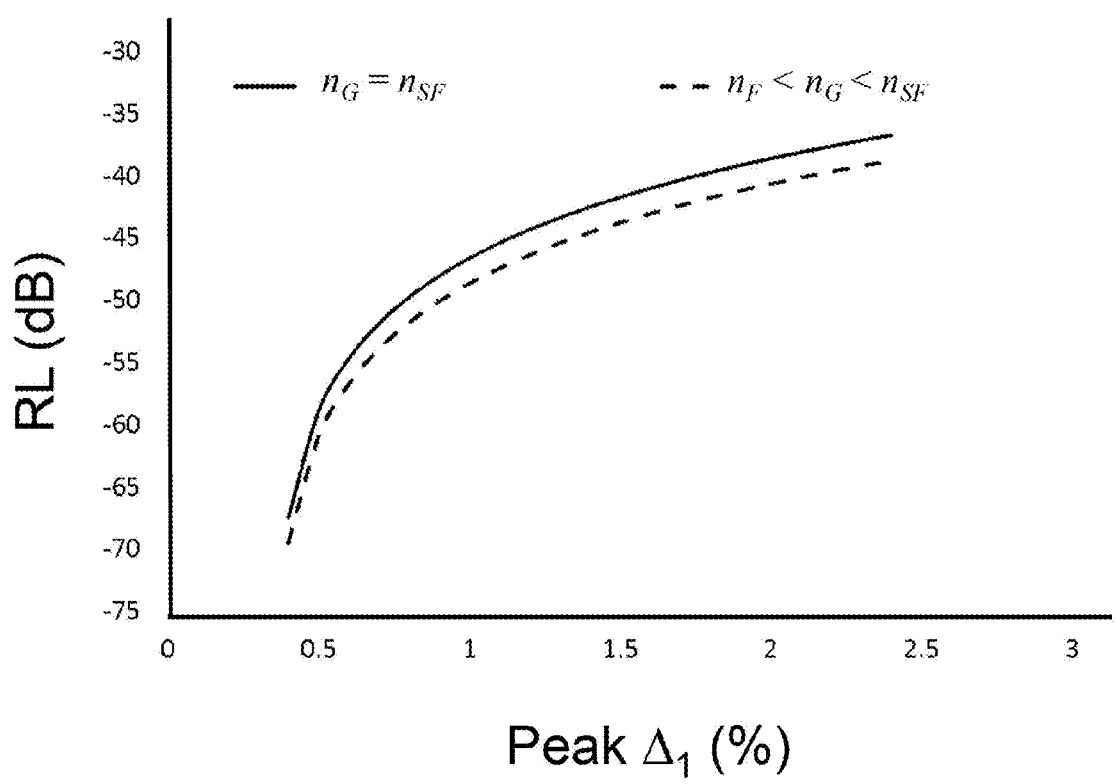
FIG. 8 is a calculated plot of the peak Δ (%) versus the return loss RL (dB) for an example UniCam® connector that includes the universal optical fiber as the stub fiber, with the connector mated to a conventional connector with a standard single mode fiber (SMF28), and showing two curves representing two cases for the gel refractive index $n_G$.

When fiber 100 has a high peak $\Delta_1$, the return loss (RL) can be high when the fiber is connected to a standard single mode fiber. FIG. 8 is a calculated plot of peak $\Delta_1$(%) on the horizontal axis and the return loss RL (dB) on the vertical axis for an example UniCam® connector that includes fiber 100 as the stub fiber, with the connector mated to a conventional connector with a standard single mode fiber (SMF28). The calculations assumed an index matching gel 66 wherein the gel index $n_G$ is between that of the single-mode field fiber 40 and stub fiber 100.

The two curves in FIG. 8 correspond to the gel index $n_G$ matching the core index $n_F$ of SMF28 field fiber (solid curve) and to when $n_G$ is between the field-fiber index $n_F$ and the stub-fiber index $n_{SF}$ (taken to be the maximum index of first core segment 106) (dashed-line curve). FIG. 8 indicates that the return loss RL is reduced by 2 dB by using an optimum index-matching gel 66 with an index $n_G$ between $n_F$ and $n_{SF}$.

FIG. 8 also shows that the return loss RL decreases as the peak $\Delta_1$ is reduced. In an example, the return loss RL of connector 10 is less than −40 dB.

Figure 7A:
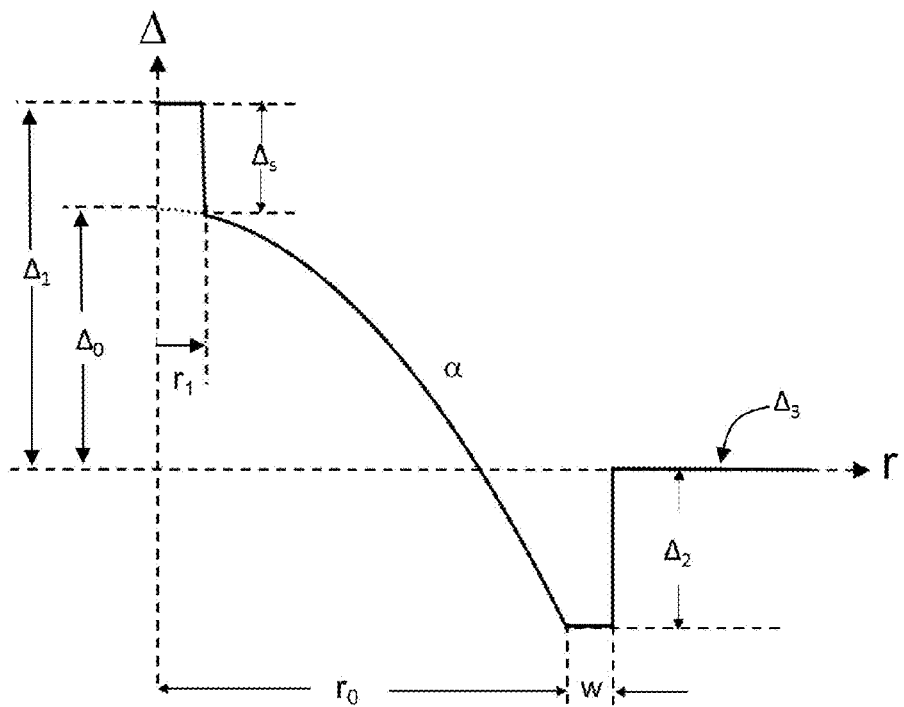
FIGS. 7A through 7D are plots of the relative refractive index Δ as a function of radius r that illustrate four main exemplary configurations for the universal optical fiber disclosed herein.
Figure 7B:
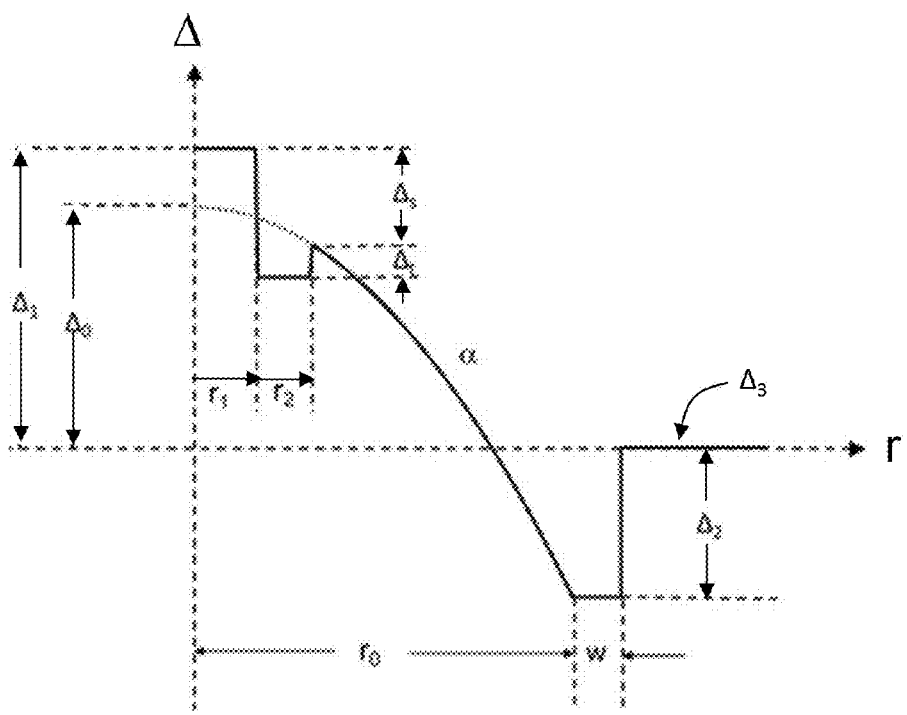

Table 1 below sets forth four example configurations (i.e., Examples 1 through 4) of fiber 100 having the $\Delta$ profile of FIG. 7A-C. Example 1 is for the case where $\Delta_2=0$, i.e., no down-doping. In Table 1 (and also Table 2 that follows), $\Delta n_g$ is the group index difference, $NA_{MM}$ is the multimode numerical aperture and $NA_{SM}$ is the single-mode numerical aperture. The number following $NA_{MM}$ is the applicable core radius for the MMF fiber.

TABLE 1

| | Example 1 | Example 2 | Example 3 | Example 4 |
|---|---|---|---|---|
| $\Delta_0$ | 1% | 0.55% | 0.55% | 0.75% |
| $\Delta_1$ | 1.25% | 0.80% | 0.80% | 0.90% |
| $\Delta_2$ | 0 | −0.45% | −0.45% | −0.25% |
| $\Delta_s$ | 0.26% | 0.26% | 0.26% | 0.25% |
| $\Delta_t$ | N/A | N/A | N/A | 0.09% |
| $r_0$ (μm) | 25 | 25 | 25 | 25 |
| $r_1$ (μm) | 2.8 | 2.8 | 2.8 | 4 |
| $r_2$ (μm) | N/A | N/A | N/A | 7.6 |
| w (μm) | N/A | N/A | 10 | 15 |
| α | 2 | 2 | 2 | 1.99 |
| $NA_{SM}$ | 0.104 | 0.104 | 0.104 | 0.117 |
| MFD @ 1310 nm (μm) | 9.1 | 9.1 | 9.1 | 9.2 |
| MFD @ 1550 nm (μm) | 10.7 | 10.7 | 10.7 | 10.5 |
| $\lambda_c$ (nm) | 756 | 756 | 756 | 948 |
| $\Delta n_{g11}$ @ 1310 nm | $2.7 \times 10^{-3}$ | $2.6 \times 10^{-3}$ | $2.6 \times 10^{-3}$ | $2.1 \times 10^{-3}$ |
| $\Delta n_{g11}$ @ 1550 nm | $2.5 \times 10^{-3}$ | $2.4 \times 10^{-3}$ | $2.4 \times 10^{-3}$ | $2.7 \times 10^{-3}$ |
| $NA_{MM}$ @ 50 μm | 0.205 | 0.205 | 0.205 | 0.205 |
| Return Loss (dB) | −46 | −52 | −52 | −50 |

The example configurations of fiber 100 can be used as a stub fiber for both single mode and 50 μm multimode connectors 200. In Example 1, the central single-mode core segment 106 has $\Delta_S=0.26\%$ and a radius $r_1=2.8$ μm. The MFDs at 1310 nm and 1550 nm are 9.1 and 10.7 μm, respectively, which are very closely matched to those of standard single mode fibers. The core cutoff wave length $\lambda_C$ is 756 nm, well below 1310 nm. The group index difference $\Delta n_{g11}$ is slightly smaller than that of SMF-28 of $4.0\times10^{-3}$. In this example, the peak value of $\Delta_1=1.25\%$. The return loss RL is −46 dB. To reduce the return loss RL, one can use down-doping to reduce $\Delta_2$.

Example 2 of Table 1 sets forth a configuration in which $\Delta_2$ is down-doped to −0.45%. The return loss RL is reduced to −52 dB. All of the other fiber properties of Example 2 are the same as Example 1. The same return loss RL and other fiber properties can also be obtained by partially down-doping the cladding, which reduces manufacturing costs associated with down-doping.

Example 3 of Table 1 sets forth a configuration in which only the inner cladding 126 (with w=10 μm) is down-doped. The other fiber properties of Example 3 are the same as Example 2. To add more flexibility to the central single-mode core design, depressed cladding layer 108 can be used, as shown in FIG. 7B.

Example 4 sets forth configuration that includes depressed cladding layer 108. In this design, $NA_{SM}$ is slightly higher to better match the MFDs to standard single mode fibers. The inner cladding 126 has width w=15 μm and is down-doped to reduce the peak delta $\Delta_1$. The return loss in this example is RL=−50 dB.

Figure 7C:
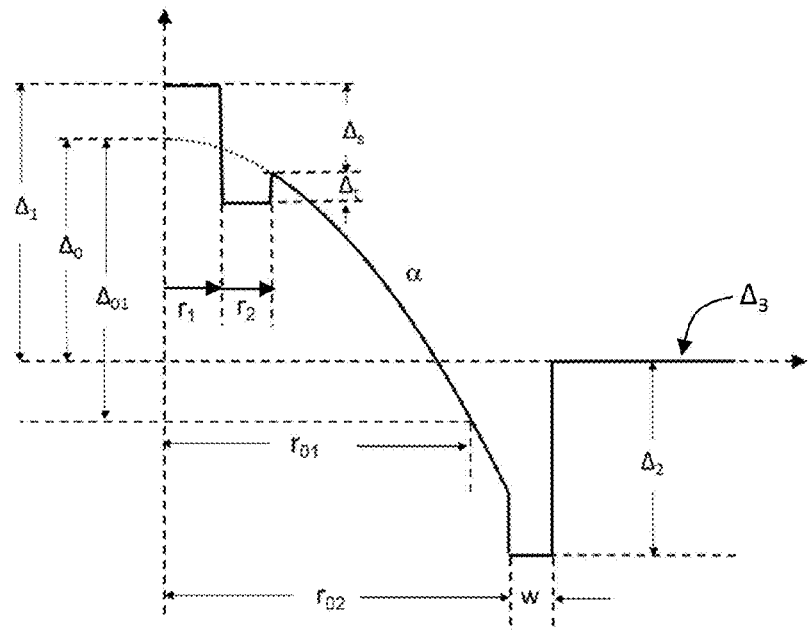
Figure 7D:
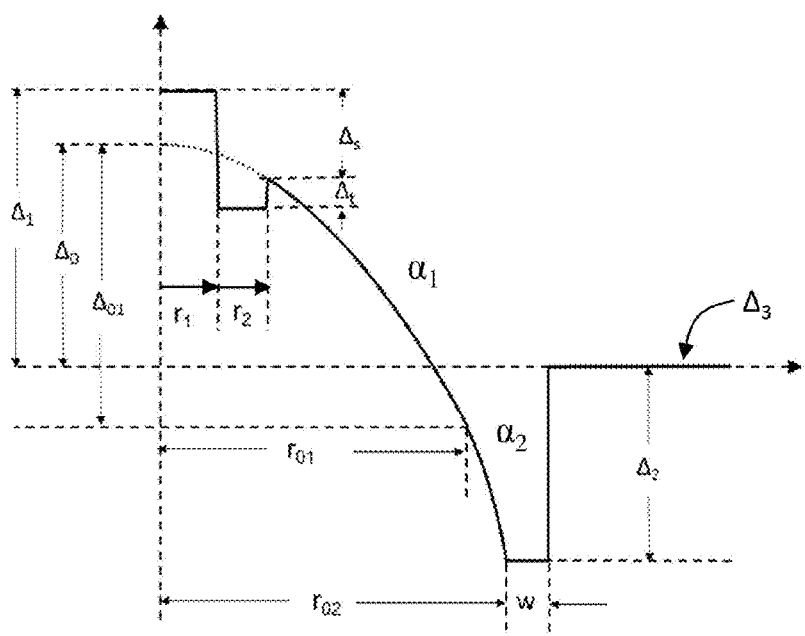

FIG. 7C illustrates an example configuration for fiber 100 corresponding to FIG. 5C and that can be used for single mode, 50 μm multimode and 62.5 μm multimode connectors 200. It has a central single-mode core segment 106 for single mode operation. It has also two multimode core sections 110-1 and 110-2 with two different diameters $r_{01}$ and $r_{02}$. The first multimode core has a core delta of $\Delta_{01}$, and a core radius of $r_{01}$ and a that matches that of a 50 μm multimode fiber. The entire $\Delta$ profile can be used for connecting to a multimode fiber having a 62.5 μm multimode core diameter. The first multimode core and the second multimode core can share the same α shape but can be truncated as shown in FIG. 7C, or can have two different alphas $\alpha_1$ and $\alpha_2$, as shown in FIG. 7D.

Table 2 below summarizes three example designs (Examples 5 through 7) for fiber 100 suitable for us as the stub fiber in connector 200 to be used for connecting to single mode, 50 μm multimode and 62.5 μm multimode fibers.

TABLE 2

| | Example 5 | Example 6 | Example 7 |
|---|---|---|---|
| $\Delta_0$ | 2% | 0.8% | 0.8% |
| $\Delta_1$ | 2.15% | 0.95% | 0.95% |
| $\Delta_2$ | 0 | −1.2% | −1.2% |
| $\Delta_s$ | 0.24% | 0.24% | 0.24% |
| $\Delta_t$ | 0.07 | 0.07% | 0.07% |
| $\Delta_{01}$ | 1% | 1% | 1% |
| $r_{01}$ (μm) | 25 | 25 | 25 |
| $r_{02}$ (μm) | 31.25 | 31.25 | 31.25 |
| $r_1$ (μm) | 4 | 4 | 4 |
| $r_2$ (μm) | 7.8 | 7.8 | 7.8 |
| w (μm) | N/A | 15 | 15 |
| $\alpha_1$ | 1.99 | 1.99 | 1.99 |
| $\alpha_2$ | N/A | N/A | 3.1 |
| Single mode core NA | 0.116 | 0.116 | 0.116 |
| MFD at 1310 nm (μm) | 9.2 | 9.2 | 9.2 |
| MFD at 1550 nm (μm) | 10.6 | 10.6 | 10.6 |
| $\lambda_c$ (nm) | 964 | 964 | 964 |
| $\Delta n_g$ @ 1310 nm | $2.0 \times 10^{-3}$ | $2.0 \times 10^{-3}$ | $2.0 \times 10^{-3}$ |
| $\Delta n_g$ @ 1550 nm | $2.5 \times 10^{-3}$ | $2.5 \times 10^{-3}$ | $2.5 \times 10^{-3}$ |
| $NA_{MM}$ @ 50 um | 0.205 | 0.205 | 0.205 |
| $NA_{MM}$ @ 62.5 um | 0.289 | 0.289 | 0.289 |
| RL(dB) | −40 | −49 | −49 |

Example 5 sets forth a configuration for fiber 100 that has no down-doping. It has one alpha core shape with $\alpha_1=1.99$ that is truncated at radius of $r_{01}=31.25$ μm. Because the peak $\Delta_1$ is high (2.15%), the return loss is RL=−40 dB. Example 6 sets forth a configuration for fiber 100 similar to Example 5, but with a down-doped inner cladding 108, with $\Delta_2=-1.2\%$. The return loss is reduced to RL=−49 dB. Example 7 is another profile design with down-doped inner cladding segment, but the core has two alpha segments, $\alpha_1=1.99$ and $\alpha_2=3.10$.

Examples 5 through 7 have MFD's matched to that of standard single mode fibers, low-cutoff wavelengths $\lambda_C$, and at the same time have group index delays $\Delta n_g$ at the same or lower level as for the example single mode fiber SMF-28. The example fibers 100 have a multimode core segment of 50 μm in diameter and $NA_{MM}$ of 0.205, which match the parameters of 50 μm multimode fiber and also have a multimode core of 62.5 μm in diameter with $NA_{MM}$ of 0.289, which are similar to 62.5 μm multimode fibers.

It will be apparent to those skilled in the art that various modifications to the preferred embodiment of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber for use as a stub fiber in an optical fiber connector comprising:

a segmented core with a relative refractive index $\Delta_1$ in the range 0.3%≤$\Delta_1$≤2.5% and having a substantially step-index single-mode segment with a radius $r_1$ in the range 2.5 μm≤$r_1$≤5 μm and a relative refractive index $\Delta_s$ or $\Delta_s+\Delta_t$ in the range 0.2%≤{$\Delta_s$ or $\Delta_s+\Delta_t$}≤0.4%, and at least one alpha-profile multimode segment having a radius $r_0$ in the range 10 μm≤$r_0$≤50 μm and a profile parameter α in the range 1.8≤α≤4.1;

a cladding surrounding the segmented core, the cladding having an inner cladding segment of width w in the range 5 μm≤w≤20 μm and relative refractive index $\Delta_2$, and an outer cladding segment having a relative refractive index $\Delta_3$, wherein 1.5%≤$\Delta_2$≤$\Delta_3$; and a length L in the range from 10 mm to 20 mm.

2. The optical fiber according to claim 1, wherein 0.4%≤$\Delta_1$≤2%.

3. The optical fiber according to claim 1, wherein 22 μm≤$r_0$≤35 μm.

4. The optical fiber according to claim 1, wherein 1.9≤α≤2.5.

5. An optical fiber connector, comprising:
the optical fiber according to claim 1 having a first end and operably supported by a first alignment member; and
a field optical fiber having a second end and operably supported relative to the first alignment member by a second alignment member such that the respective first and second ends of the stub fiber and field optical fiber are operably aligned and interfaced.

6. The optical fiber connector according to claim 5, wherein the length L of the stub fiber is in the range from 15 mm to 20 mm.

7. The optical fiber connector according to claim 5, further comprising a splicing member configured to operably align and interface the stub fiber and the single-mode field optical fiber.

8. The optical fiber connector according to claim 7, wherein the splicing member further comprises an interior that contains an index-matching material.

9. The optical fiber connector according to claim 5, wherein the field optical fiber is either a single mode fiber or a multimode fiber.

10. The optical fiber connector according to claim 5, having a return loss that is less than −40 dB.

11. An optical fiber for use as a stub fiber in an optical fiber connector comprising:
a segmented core having a substantially step-index single-mode segment and at least one multimode segment having an alpha profile, wherein the single-mode segment has an associated mode field diameter substantially the same as a conventional single-mode optical fiber, and has substantially the same or a smaller group index difference $\Delta n_g$ as compared to the conventional single mode fiber;
wherein the at least one multimode segment has radius and a numerical aperture $NA_{MM}$ that substantially match that of a conventional multimode optical fiber; and
wherein the stub fiber has a length L in the range from 10 mm to 20 mm.

12. The optical fiber according to claim 11, wherein the substantially step-index single-mode segment has a radius $r_1$ in the range 2.5 μm≤$r_1$≤5 μm and a relative refractive index $\Delta_s$ or $\Delta_s+\Delta_t$ in the range 0.2%≤{$\Delta_s$ or $\Delta_s+\Delta_t$}≤0.4%.

13. An optical fiber connector, comprising:
the optical fiber according to claim 10 serving as said stub fiber and having a first end and operably supported by a first alignment member; and
a field optical fiber having a second end and operably supported relative to the first alignment member by a second alignment member such that the respective first and second ends of the stub fiber and field optical fiber are operably aligned and interfaced.

14. The optical fiber connector according to claim 13, wherein the length L of the stub fiber is in the range from 15 mm to 20 mm.

15. The optical fiber connector according to claim 13, further comprising a splicing member configured to operably align and interface the stub fiber and the single-mode field optical fiber.

16. The optical fiber connector according to claim 13, wherein the splicing member further comprises an interior that contains an index-matching material.

17. The optical fiber connector according to claim 13, wherein the field optical fiber is either a standard single mode fiber, or a multimode fiber.

18. The optical fiber connector according to claim 13, having a return loss that is less than −40 dB.

19. An optical fiber connector for connecting to either a single-mode optical fiber or a multi-mode optical fiber, comprising:
a stub fiber having a length L of between 10 mm and 20 mm, a first end and a core having single-mode and multimode segments, wherein the single-mode segment has a substantially step-index profile, a mode field diameter substantially the same as that of a conventional single-mode optical fiber and has substantially the same or a smaller group index difference $\Delta n_g$ as compared to the conventional single mode fiber, and wherein the multimode segment has an alpha profile, a radius $r_0$ in the range 22 μm≤$r_0$≤35 μm, and a numerical aperture $NA_{MM}$ that substantially match that of a conventional multimode optical fiber;
a first alignment member that operably supports the stub fiber; and
a field optical fiber having a second end and that is operably supported relative to the first alignment member by a second alignment member such that the respective first and second ends of the stub fiber and field optical fiber are operably aligned and interfaced.

20. The optical fiber connector according to claim 19, further comprising a splicing member configured to operably align and interface the stub fiber and the single-mode field optical fiber.

21. The optical fiber connector according to claim 19, wherein the splicing member further comprises an interior that contains an index-matching material.

22. The optical fiber connector according to claim 19, wherein the field optical fiber is either a standard single mode fiber, or a multimode fiber.

23. The optical fiber connector according to claim 19, having a return loss that is less than −40 dB.

* * * * *